United States Patent [19]
Li

[11] Patent Number: 5,955,983
[45] Date of Patent: Sep. 21, 1999

[54] OPTICAL FIBER BASED RADARS

[76] Inventor: Ming-Chiang Li, 11415 Bayard Dr., Mitchellville, Md. 20721

[21] Appl. No.: 08/439,284

[22] Filed: May 11, 1995

Related U.S. Application Data

[63] Continuation of application No. 08/018,388, Feb. 17, 1993, abandoned.

[51] Int. Cl.[6] .............................. G01S 7/28; G01S 13/86
[52] U.S. Cl. ........................... 342/54; 342/107; 342/129; 342/164
[58] Field of Search .................................... 342/129, 131, 342/133, 137, 52, 54, 56, 58, 59, 107, 109, 114, 164

[56] References Cited

U.S. PATENT DOCUMENTS

| | | | |
|---|---|---|---|
| 5,294,930 | 3/1994 | Li | 342/13 |
| 5,296,860 | 3/1994 | Li | 342/58 |

*Primary Examiner*—John B. Sotomayor

[57] ABSTRACT

A radar system comprises an optical fiber RF storage subsystem for storing a portion of RF signals before the transmission. The radar system further comprises a coherent RF receiver to process reflected RF signals using stored RF signals as a reference. Furthermore, the optical fiber RF storage system is used to store initially received RF signals for comparison with sequentially received RF signals.

20 Claims, 6 Drawing Sheets

100

OPTICAL FIBER BASED RADARS

CROSS-REFERENCE TO RELATED APPLICATIONS

This application is a continuation of Ser. No. 08/018,388 filed Feb. 17, 1993 now abandoned.

This application is related to application Ser. No. 07/877,419, Group Art Unit: 2202, Filing Date: May 1, 1992, and Ser. No. 07/787,085, Group Art Unit: 2202, Filing Date: Nov. 4, 1991.

TECHNICAL FIELD OF INVENTION

This invention relates to a radar system which utilizes optical fibers to store the initially transmitted RF signals for comparison with RF signals from reflection. The invention further relates to a passive RF system which utilizes optical fiber to store initially received RF signals for comparison with sequentially received RF signals. The present invention drastically increases the functional capabilities of radars and passive RF systems.

BACKGROUND

Radar is a measurement system used to detect and locate objects, and to determine their approaching or receding speeds. It must transmit a particular form of radio frequency (RF) signals in order to achieve one of these specific goals. Many types of radars are in use at the present. In general, they can be divided into two groups: continuous wave (CW) and pulsed.

Pulsed radars emit short RF signals in the form of pulses. These pulses are transmitted to and reflected by objects. From reflected pulses, one can detect the existence and locate the positions of these objects, which cause the reflection of RF signals. CW radars emit RF signals in the form of continuous waves, which have well defined RF frequencies. As the waves reflected by the objects in motions, the well defined frequencies are altered. The alterations are often referred to as Doppler shifts. The approaching or receding velocities of these objects with respect to the transmitting radars can be calculated from the Doppler shifts.

A pulsed RF wave does not have a well defined frequency. The spread in frequency is directly related to its pulse duration. The shorter is the pulse duration, the larger is the frequency spread, and the better in locating objects. A 100 nanoseconds pulse, which yields the target position with uncertainty of 500 feet, has a spread more than 10 MHz. The Doppler shifts for usual objects of interest are below several hundred KHz. The frequency spread makes a single radar pulse useless in determining the motions of objects. Multiple radar pulses are needed to reveal target motions; they are often referred to as moving target indication (MTI) and pulse Doppler radars. The major difference of these two pulsed radars are their pulse repetition rates. A MTI radar has a lower pulse repetition rate than that of a pulse Doppler radar. The MTI radar yields a clear unambiguous range determination, but the motion indication is poor and often ambiguous. The pulse Doppler radar with its high pulse repetition rate yields a clear unambiguous Doppler determination, but the range indication is poor and ambiguous. Both MTI and pulse Doppler radars require interpulse coherence among transmitted RF pulses which is an stringent requirement.

CW radars do not provide range information in locating positions of objects. One method to overcome the restriction is through the modulation of their continuous RF waves. An implementation of amplitude modulation changes a CW radar to a pulse radar. Another method is through the frequency modulation of their RF carriers. The ranging capability of frequency modulated radars depends on the frequency excursion. A greater frequency excursion leads to a better range resolution, but to a poorer capability in the Doppler shift determination for these frequency modulated radars.

The above mentioned radars are called operational radars. Beside these radars, there are instrumentation radars, which are capable of producing RF image of objects. The instrumentation radars usually have very high pulse repetition rates and short pulse durations in order to capture the RF images of moving objects and to suppress background contaminations. They are short range in nature, and not for the operational use. The instrumentation radars are only deployed in test ranges.

In light of the above, there is a need in the art for a radar system which is capable of determining both range information and Doppler shifts without stringent interpulse requirement and range ambiguities. Furthermore, the new radar systems are capable of revealing the RF images of objects during field operations.

SUMMARY OF THE INVENTION

Embodiments of the present invention advantageously satisfy the above-identified need in the art which has a board functional capability. Embodiments of the present invention will provide a radar system which is generic, versatile and sophisticated. A deployment of such a radar system will trim the radar proliferation and enhance the performance of radar operations. In particular, embodiments of the present invention comprise an optical fiber RF storage subsystem for storing the initially transmitted RF signals for comparison with RF signals from reflection.

In preferred embodiments of the present invention, the optical fiber based radars are equipped with intra pulse coherent processing subsystems. As a result, a single new radar will have the functional capabilities of determining the range, Doppler shift, and RF image of targeting objects. The range ambiguity associated with high pulse repetition rates will no longer be a problem in the light of intra pulse coherence. Furthermore, a radar of the present invention will drastically reduce interferences from other radars and will effectively suppress hostile incoherent jamming. In other embodiments of the present invention, the optical fiber RF storage and intra pulse coherent processing subsystems are directly added to conventional radars to upgrade their functional capabilities. The addition will not interfere with normal radar operations. An upgraded radar becomes capable of measuring Doppler shifts of multiple targets at different ranges.

BRIEF DESCRIPTION OF THE DRAWING

A complete understanding of the present invention may be gained by considering the following detailed description in conjunction with the accompanying drawing, in which.

DETAILED DESCRIPTION

Figure 1:
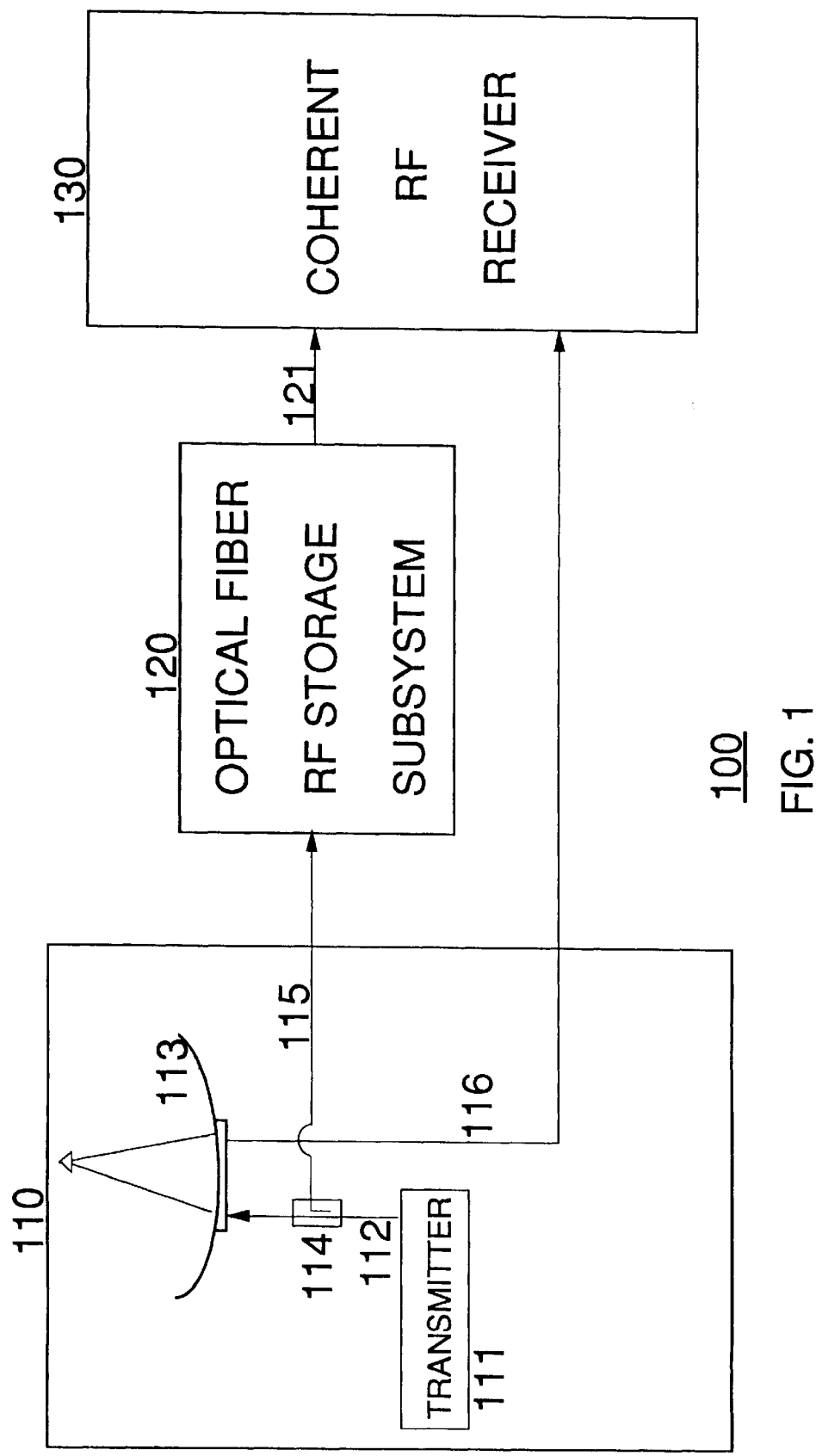
FIG. 1 shows a block diagram of an optical fiber based radar fabricated in accordance with the present invention.

FIG. 1 shows a block diagram of embodiment 100 of an optical fiber based radar fabricated in accordance with the present invention. As shown in FIG. 1 the optical fiber based radar is comprised of radar transmitting subsystem 110, optical fiber RF storage subsystem 120 ("OFRSS 120"), and coherent RF receiver 130 ("CRFR 130"). Radar transmitting subsystem 110 comprises transmitter 111, coupler 114, and antenna subsystem 113, which are well known to those of ordinary skill in the art.

During an operation, transmitter 111 generates RF signals 112 for transmission through antenna subsystem 113. Before the transmission, a portion of RF signals 112 is tapped through coupler 114. Tapped RF signals 115 is sent to OFRSS 120 for storage. A portion of reflected RF signals is received by antenna subsystem 113. Reflected RF signals 116 are sent to CRFR 130 for processing. After the arrival of RF signals 116, CRFR 130 uses stored RF signals 121 from OFRSS 120 as reference, based on the intra pulse coherence, to process reflected RF signals 116. CRFR 130 either yields the relative amplitudes and phases, or the relative frequency differences between the reflected and stored RF signals. Furthermore, CRFR 130 will correlate the reflected and stored RF signals to achieve a precise determination of the reflected signals. The manner in which CRFR 130 processes reflected RF signals is well known to those of ordinary skill in the art.

Figure 2:
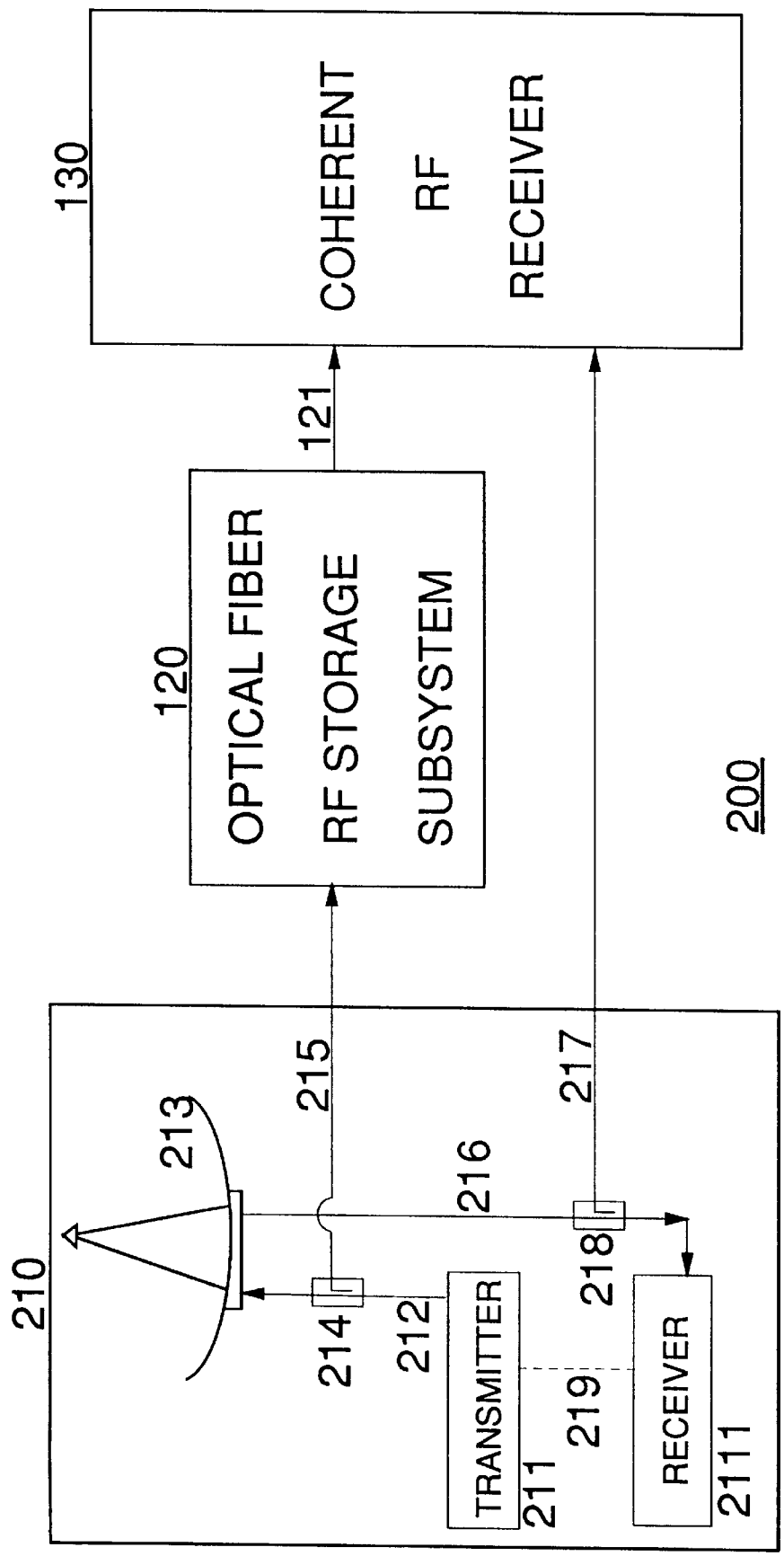
FIG. 2 shows a block diagram of an upgraded conventional radar fabricated in accordance with the present invention.

FIG. 2 shows a block diagram of embodiment 200 of an upgraded conventional radar fabricated in accordance with the present invention. As shown in FIG. 2, upgraded conventional radar 200 is comprised of conventional radar 210, OFRSS 120, and CRFR 130. Conventional radar 210 is comprised of transmitter 211, antenna subsystem 213, and receiver 2111, which are well know to those of ordinary skill in the art.

During a normal mode of operation, transmitter 211 generates RF signals 212 for transmission through antenna 213. A portion of reflected RF signals is received by antenna 213. Reflected RF signals 216 are sent to receiver 2111. Receiver 2111 uses the reference 219 from transmitter 211 to process the reflected RF signals 216. In an upgraded mode of operation, a portion of RF signals 212 is tapped through coupler 214. Tapped RF signals 115 is sent to OFRSS 120 for storage. Reflected RF signals 216 is also tapped through coupler 218. Tapped RF signals 217 are sent to CRFR 130 for processing. After the arrival of RF signals 217, CRFR 130 uses stored RF signals 121 from OFRSS 120 as reference, based on the intra pulse coherence, to process reflected RF signals 116. As those of ordinary skill in the art should readily appreciate that the upgrade mode of operation will not affect the normal mode of operation.

Figure 3:
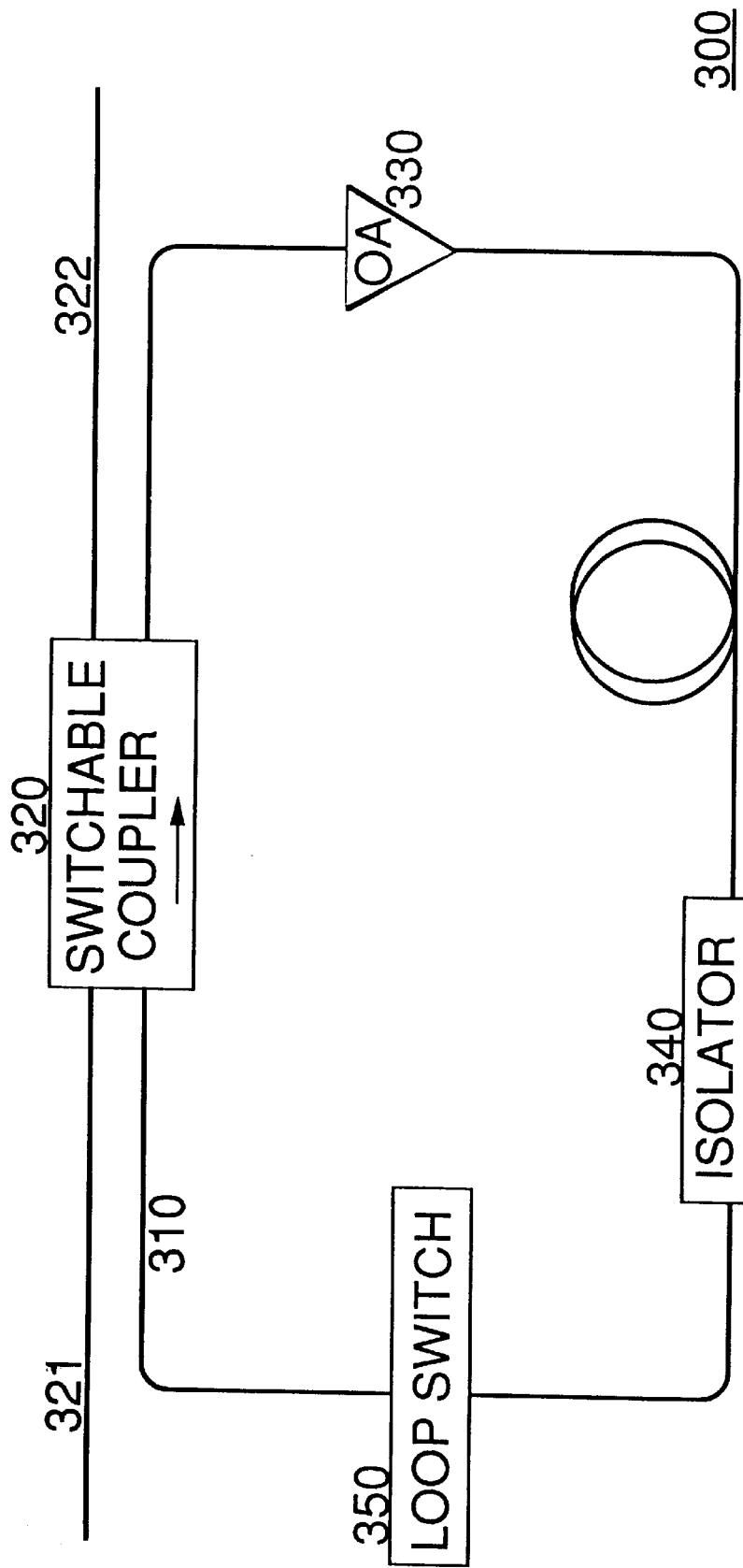
FIG. 3 shows a block diagram of an optical fiber RF delay loop for use in fabricating embodiments of the present invention.

FIG. 3 shows a block diagram of an optical fiber RF delay loop 300 for use in fabricating embodiments of the present invention. Optical fiber RF delay loop is the same RF delay loop as specified in the previous invention of the optical RF stereo. As shown in FIG. 3, the optical RF signals through optical fiber 321 are applied as input to switchable coupler 320. Switchable coupler 320 switches the optical RF signals from optical fiber 321 into optical fiber loop 310. Isolator 340 assures the optical RF signals in optical fiber loop 310 circulating only in one direction. As the optical RF signals circulate the optical fiber loop 310, the strength of optical RF signals reduces. The reduction is compensated by in-line optical amplifier 330 to keep the optical RF signals circulating in the loop again and again until switchable coupler 320 is closed. A portion of optical RF signals is switched from optical fiber loop 310 to optical fiber 322 and the remainder of optical RF signals will still circulate in optical fiber loop 310. The steps repeat again and again. The closing of loop switch 350 will quench the circulation of optical RF signals in optical fiber loop 310 before admitting any new arrivals of optical RF signals from optical fiber 321. Switchable coupler 320, In-line optical amplifier 330, isolator 340 and loop switch 350 are well known to those of ordinary skill in the art.

Figure 4:
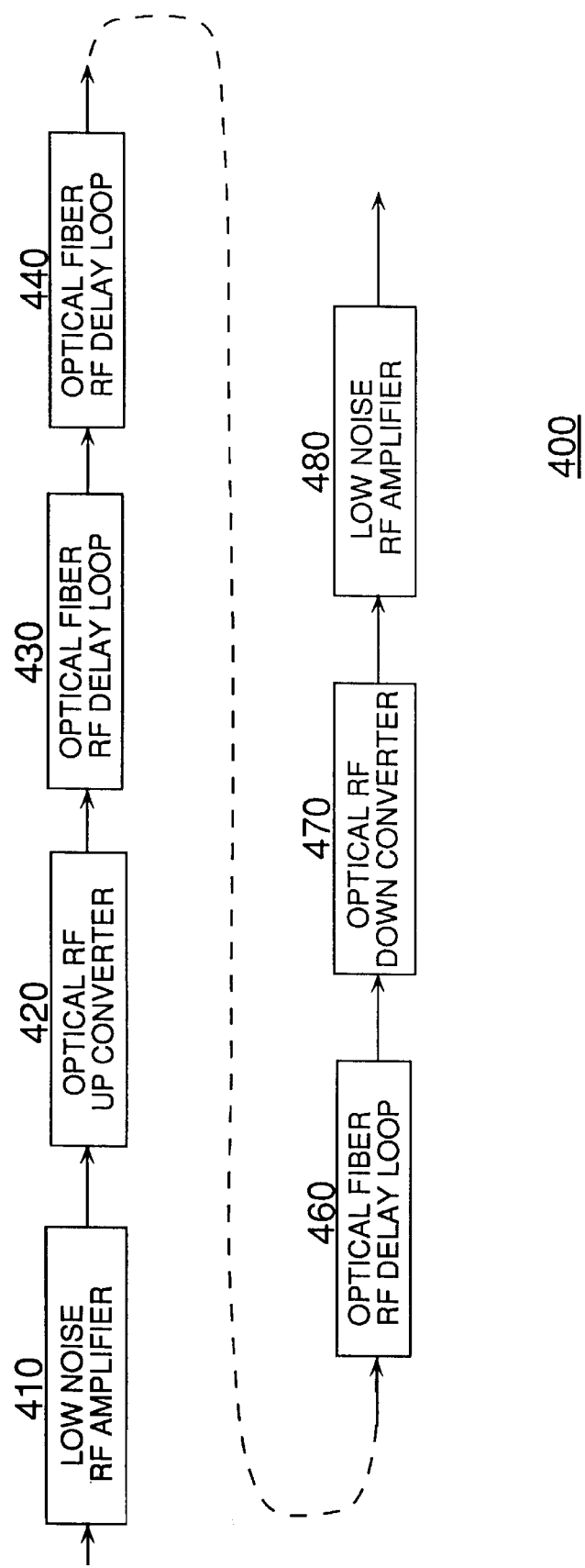
FIG. 4 shows a block diagram of an optical fiber RF storage subsystem for use in fabricating embodiments of the present invention.

FIG. 4 shows a block diagram of an optical fiber RF storage subsystem 400 for use in fabricating embodiments of the present invention. Optical fiber RF storage subsystem 400 comprises a chain of optical fiber RF delay loops. The lengths of these loops are different in magnitude. As shown in FIG. 4, low noise RF amplifier 410 receives tapped RF signals from a transmitter as input and amplifies RF signals to a proper strength in order to overcome optical conversion losses. The output from low noise RF amplifier 410 is applied as input to optical RF up converter 420. Optical RF up converter 420 converts the output from low noise RF amplifier 410 into optical RF signals. The optical RF signals from optical RF up converter 420 are applied as input to a chain of optical fiber RF delay loops 430, 440, . . . , and 460. The output from the optical fiber RF delay loops is applied as the input to optical RF down converter 470. Optical RF down converter 470 converts the optical RF signals back to RF signals and applies the RF signals to low noise RF amplifier 480. Low noise RF amplifier 480 amplifies the RF signals and applies them as input to coherent RF receiver 130 for reference.

As those of ordinary skill in the art will readily appreciate, embodiments other than the specific configuration shown in FIG. 4 may be fabricated to provide optical fiber RF storage subsystem 400. The up and down converters may have different forms and may combined with low noise RF amplifiers to form new devices. Furthermore, as in-line optical amplifiers, up and down converters become more effective, one may be able to eliminate the use of low noise RF amplifiers. As those of ordinary skill in the art will further appreciate, embodiments other than the specific architecture shown in FIG. 4 may be fabricated to provide optical fiber RF storage subsystem 400. Some of optical fiber RF delay loops may be in parallel and some of them may be replaced by tapped optical fiber RF delay lines.

In accordance with the present invention, after the arrival of reflected RF signals, coherent RF receiver uses RF signals stored in the optical fiber RF storage subsystem as reference, based on the intra pulse coherence, to process reflected RF signals. The total time delay $T_S$, for which the RF signals are stored in the optical fiber RF storage subsystem, is the sum of delays from the optical fiber RF loops, and of intrinsic delays $\pi_O$ from connecting optical fibers, converters, low noise RF amplifiers, couplers, and so on.

$$T_s = \sum_{n=1}^{N} m_n \tau_n + \tau_0,$$

where N is the total number of optical fiber RF delay loops, $\tau_n$ the time delay of each respective loop, and $m_n$ the number of circulations through the loop n. The intra pulse coherent processing requires that the round trip time $T_r$ of reflected RF signals is equal to the total time delay $T_S$, for which the RF signals have been stored in the optical fiber RF storage subsystem, $$T_r = T_S.$$

In accordance with the present invention, the optical fiber based radar comprises means in determining the round trip time $T_r$ of reflected RF signals and in selecting looping times $m_n$ of each optical fiber delay loop to satisfy the above equation. A time delay means may insert into the path of reflected signals to compensate for the response time of the coherent RF receiver. These means are well known to those of ordinary skill in the art.

As those of ordinary skill in the art will readily appreciate, embodiments of the present invention do not require the transmitters stable. Magnetrons have been used as transmitters of the conventional coherent Doppler radars in detecting the approaching or receding speeds of radar targets. Magnetrons are unstable. Several problems exist in these radars. First, magnetrons have to be constantly tuned in order to maintain the coherence. Second, coherent oscillators are required. It is difficult to maintain the oscillators coherent for long durations. Third, these radars operate in a pulse-to-pulse mode, which imposes a limit on the range. High pulse repetition rates are required to measure the Doppler velocities of fast moving targets. Higher pulse repetition rates lead to shorter ranges. The above problems do not exist in the magnetron based radars of the present invention. Magnetrons can rapidly transmit a batch of RF pulses. A copy of these pulse are stored in the optical fiber RF storage subsystem waiting for the reflected batch of RF pulses from a target. The coherent RF receiver will pair up stored RF pulses with their respective reflected RF pulses to accomplish the intra pulse coherent measurements. As those of ordinary skill in the art will readily appreciate, the round trip time delay of reflected RF pulses determines the range and the coherent processing yields the Doppler velocity of the target. Embodiments of the present invention have demonstrated that the range and velocity ambiguities are no longer correlated.

As those of ordinary skill in the art will further appreciate, embodiments of the present invention may use a RF synthesizer and RF power amplifier pair as a transmitter. It is well known to those of ordinary skill in the art that the instrumentation radars often use the RF synthesizer and RF power amplifier pair as a transmitter for RF imaging of targets. Several steps are needed in RF imaging. First, RF signals are as short pulsed. Second, on pulse-to-pulse, the RF synthesizer steps through a set of frequencies. Third, after the transmission of each pulse, the RF synthesizer has to lock on the transmitted RF frequency waiting for the return of reflected RF pulses. Fourth, for moving or unstable targets, the pulse repetition rate has to be extremely high. The high repetition rate and locked waiting have limited the useful range of these instrumentation radars. Embodiments of the present invention will overcome the above limitation. During operations, the RF synthesizer rapidly steps through a set of RF frequencies without locked waiting. A copy of these short RF pulses are stored in the optical fiber RF storage subsystem. The coherent RF receiver will then pair up the stored RF pulses with their respective reflected RF pulses to accomplish the intra pulse coherent measurements. As those of ordinary skill in the art will readily appreciate, without locked waiting, the range restriction on RF imaging of fast moving or unstable targets has been removed. Thus, the radars of the present invention are operational radars, which can image targets many, many miles away.

Figure 5:
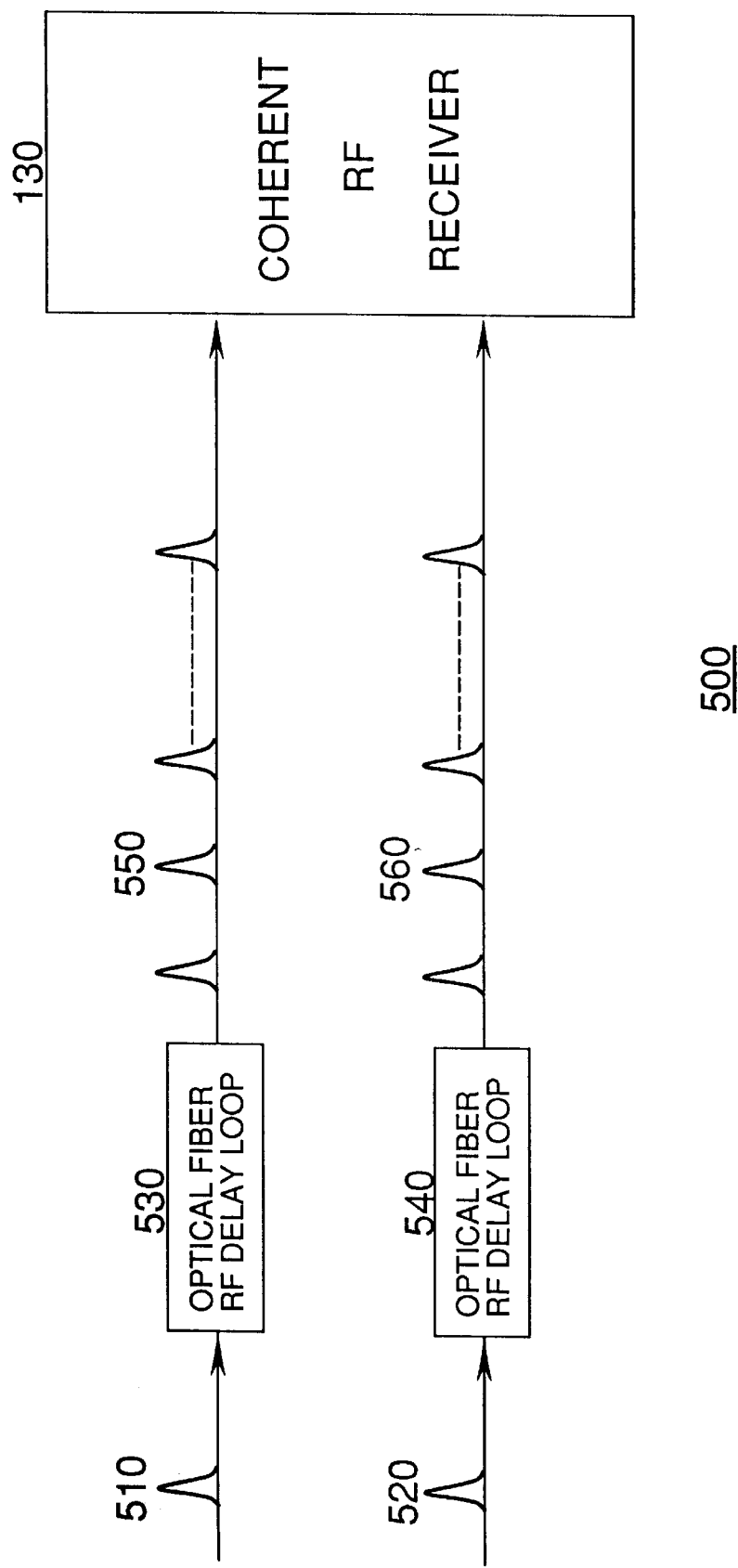
FIG. 5 shows a block diagram of an RF signal train generator for use in fabricating embodiments of the present invention.

FIG. 5 shows a block diagram of an RF signal train generator 500 for use in fabricating embodiments of the present invention. The generator comprises two identical optical fiber RF delay loops according to the present invention. As shown in FIG. 5, two temporally aligned RF pulses 510 and 520 from the optical fiber RF storage subsystem and target reflection are applied as inputs to their respective optical fiber delay loops 530 and 540. So as not to loose clarity, optical fiber RF up and down converters have not been depicted in FIG. 5. Loops 530 and 540 are identical and operated in a same manner thus respectively producing two pulse trains 550 and 560. Coherent RF receiver 130 uses pulse trains 550 and 560 as inputs yielding the Doppler frequency of the reflected RF pulse. As those of ordinary skill in the art will readily appreciate, generator 500 of the present invention virtually increase the pulse repetition rate to overcome the ambiguity.

As those of ordinary skill in the art will readily appreciate, generator 500 may be integrated with the optical fiber RF storage subsystem to reduce a number of optical-RF conversions. As those of ordinary skill in the art will readily appreciate, embodiments other than the specific architecture shown in FIG. 5 may be fabricated to provide the RF signal train generator 500. The optical fiber RF delay loop may be replaced by a tapped optical fiber RF delay line or by a set of optical fiber RF delay lines.

It is well known to those of ordinary skill in the art that a transmitter has to operate in a high pulse repetition rate in order to measure Doppler velocities of fast moving targets unambiguously. As those of ordinary skill in the art will readily appreciate, generator 500 of the present invention removes the ambiguity resulted from a low pulse repetition rate.

Figure 6:
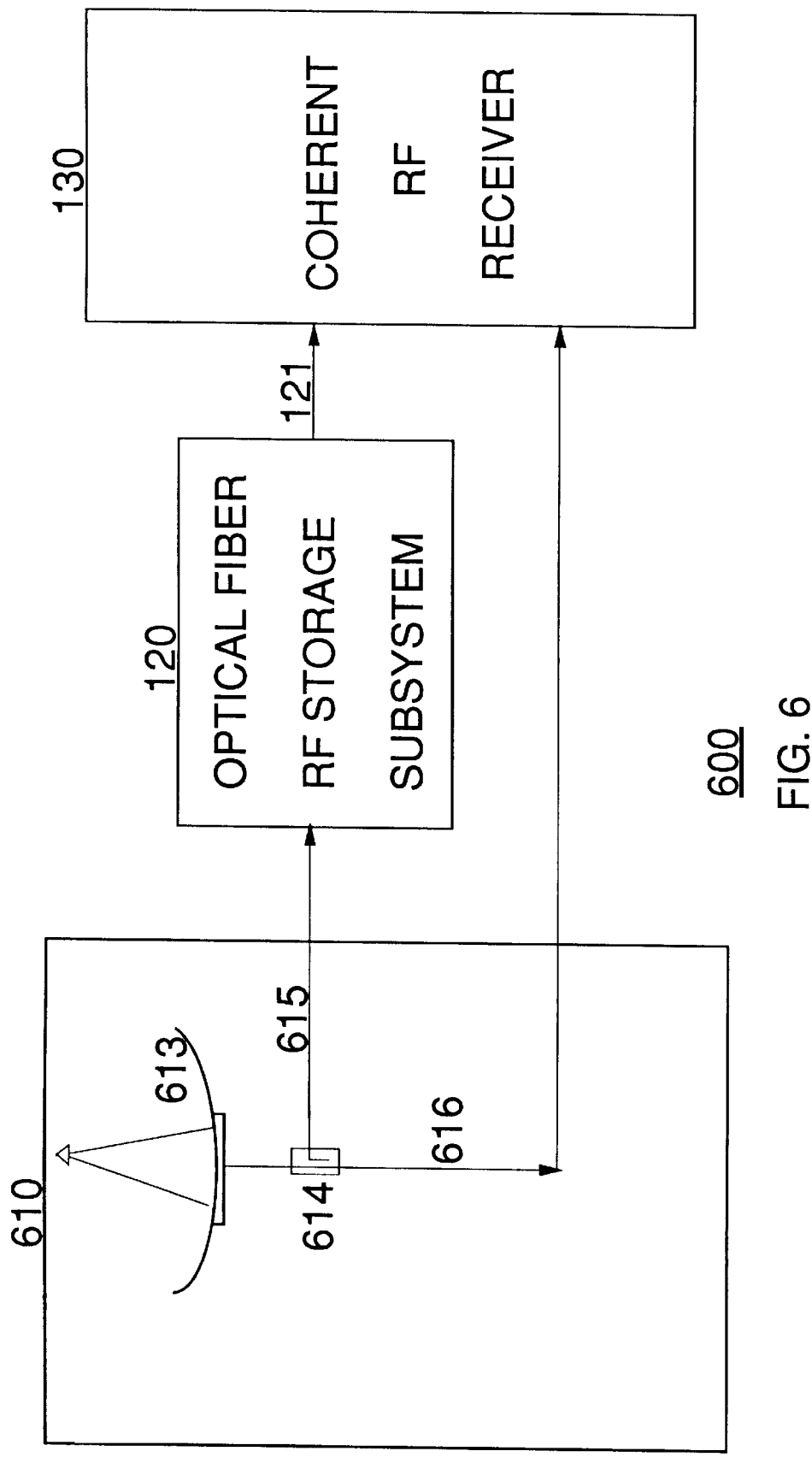
FIG. 6 shows a block diagram of an optical fiber based passive RF system fabricated in accordance with the present invention.

FIG. 6 shows a block diagram of an optical fiber based passive RF system fabricated in accordance with the present invention. As shown in FIG. 6 the optical fiber based passive RF system is comprised of passive receiving subsystem 610, OFRSS 120, and CRFR 130. Passive receiving subsystem 610 comprises antenna subsystem 613 and switchable coupler 614, which are well known to those of ordinary skill in the art.

During an operation, antenna subsystem 613 receives RF signals of opportunity. A portion of received RF signals passing through switchable coupler 614 is sent to OFRSS 120 for storage. The sequentially received RF signals are sent to CRFR 130 for processing. After the arrivals of RF signals, CRFR 130 uses stored RF signals from OFRSS 120 as reference, based on the inter pulse coherence, then processes sequentially received RF signals. CRFR 130 either yields the relative phase, frequency, or time arrival differences between the originally stored and sequentially received RF signals. The manner in which CRFR 130 processes received RF signals is well known to those of ordinary skill in the art.

As those of ordinary skill in the art will readily appreciate, RF signals other than reflected RF signals may be received by the optical fiber based passive RF system. Other RF signals may be the direct RF signals from independent and noncooperative radars or from communication transmitters. The further embodiments of the present invention comprise means in suppressing sideband modulations of the carrier frequency of communication and radar RF signals. The means in suppressing side band are well known to those of ordinary skill in the art.

Advantages and Objectives

Embodiments of the present invention are advantageous because optical fiber RF storage subsystems increase the functional diversities of conventional radars which in turn enhance the radar's abilities in detecting and locating objects, and determining their approaching or receding speeds. In addition, the use of optical fiber RF storage subsystems makes possible for operational radars to image these objects, to measure Doppler velocity with unstable RF transmitters, and to determine both ranges and Doppler velocities simultaneously without ambiguities. Furthermore, embodiments of the present invention enable optical fiber based radars to determine Doppler velocities of fast moving objects without their RF transmitters operating in high pulse repetition rates.

Embodiments of the present invention are advantageous because they provide advanced means to upgrade conventional radars than those furnished by the prior art. As those of ordinary skill in the art will further appreciate, embodiments of the present invention provide added upgrades to the existing radars without modification, which in turn will be more cost effective and will not interrupt the radars presently in operation.

As those of ordinary skill in the art will further appreciate, embodiments of the present invention, which are based on the intra pulse coherence, will be more resist to hostile jamming, to mutual electromagnetic interferences, to clutter and background contaminations, to multiple target competitions, and to unfriendly deceptions than conventional radars.

As those of ordinary skill in the art will further appreciate, embodiments of the present invention, which are based on the storage of the transmitted RF signals rather than locking of transmitters, will make radars of the present invention more robust and efficient than conventional radars. Many spread spectrum methods can be incorporated with embodiments of the present invention. These spread spectrum methods will become more sophisticated than that with conventional radars. The methods for processing RF signals by optical means has been in advances rapidly. As those of ordinary skill in the art will appreciate, embodiments of the present invention provide a simple architecture in adapting these new means.

As those of ordinary skill in the art will appreciate, embodiments of the present invention can be readily incorporated and integrated with the optical fiber based bistatic radars, optical RF networks, optical RF stereos, computer and communication networks to form very sophisticated systems in air traffic controls, war engagements, tactical testings and trainings, harbor and highway traffic controls, and environmental managements. Those of ordinary skill in the art will further appreciate, embodiments of the present invention can be tethered by sending the antenna subsystem and transmitter to the area of interest.

As those of ordinary skill in the art will appreciate, passive RF systems, which are based on the inter pulse coherence, provide advanced means in exploiting physical characteristics, and locating positions and speeds of RF emitters. Those of ordinary skill in the art will further appreciate, passive RF systems will furnish optimum means in collecting electronic intelligence.

Summary, Ramifications, and Scope

Those skilled in the art recognize that further embodiments of the present invention may be made without departing from its teachings. For example, the optical fiber based radars may have many designs as well as different variations. Thus the scope of the invention should be determined by appended claims and their legal equivalent, rather by the examples presented here.

What is claimed is:

1. A radar system comprises:

a transmitter;

an antenna subsystem;

an optical fiber RF storage subsystem;

a coherent RF receiver;

wherein the transmitter comprises means for generating RF signals; wherein the antenna subsystem comprises means for transmission of generated RF signals and for receiving reflection of RF signals; wherein the optical fiber RF storage subsystem comprises means for storing a portion of generated RF signals from the transmitter; wherein the coherent RF receiver comprises means for processing the reflected RF signals from the antenna subsystem by using the stored RF signals from the optical fiber RF storage subsystem as a reference.

2. The radar system of claim 1 wherein said optical fiber RF storage subsystem comprises a series of optical fiber RF delay loops, low noise RF amplifiers, and optical RF converters; wherein the optical fiber RF delay loops comprise means for circulating RF signals; wherein the low noise RF amplifiers comprise means for amplifying RF signals; wherein the optical RF converters comprise means for converting RF signals to optical signals and for converting optical signals to RF signals.

3. The radar system of claim 2 wherein said optical fiber RF delay loop comprises a switchable coupler, an optical fiber loop, an isolator, a loop switch, and optical amplifiers; wherein the switchable coupler comprises means for switching optical RF signals into and out of the optical fiber loop; wherein the isolator comprises means for assuring the optical RF signals in optical fiber loop circulating in one direction; wherein the loop switch comprises means for quenching the circulation of the optical RF signals in the optical fiber loop; wherein the optical amplifiers comprise means for compensating strength reductions of optical RF signals in the optical fiber RF loop.

4. The radar system of claim 1 wherein said means for processing the reflected RF signals further comprises means for determining a round trip time of the reflected RF signals, for determining the total delay time of the store RF signals in the optical fiber RF storage subsystem, and for selecting a total time delay of stored RF signals equal to the round trip time.

5. The radar system of claim 1 wherein said means for processing the reflected RF signals further comprises means for generating a RF signal train, for storing a portion of the RF signal train before the transmission in the optical fiber RF storage subsystem, for transmitting the generated RF signal train, for receiving a portion of reflected RF signal train, and for sending the stored and reflected RF signal trains to a coherent receiver; wherein the coherent RF receiver comprises means for processing the reflected RF signal train by using the stored RF signal train as reference.

6. The radar system of claim 1 wherein said means for processing reflected RF signals further comprises means for generating a set of frequency stepped RF signals, for storing a portion of frequency stepped RF signals before the transmission in the optical fiber storage subsystem, for transmitting the frequency stepped RF signals, for receiving a portion of frequency stepped RF signals from reflection, and for sending the stored and reflected RF signals to a coherent receiver; wherein the coherent RF receiver comprises means for processing the frequency stepped RF signals from reflection by using the stored RF signals as a reference; wherein the coherent RF receiver further comprises means for converting the processed RF signals to RF images.

7. The radar system of claim 1 wherein said means for processing the reflected RF signals further comprises an RF signal train generator for generating RF signal trains of stored and reflected RF signals; wherein the coherent RF receiver comprise means for processing the train of reflected RF signals by using the train of stored RF signals as a reference.

8. The radar system of claim 7 wherein said RF signal train generator comprises two optical fiber RF delay loops; wherein one optical fiber RF delay loop comprises means for circulating reflected RF signals and other optical RF fiber delay loop comprises same means for circulating stored RF signals.

9. The radar system of claim 1 which further comprises an optical RF link system; wherein the optical RF link system comprises means to link the transmitter and antenna subsystem with the coherent RF receiver.

10. A method for operating radar system which comprises steps of:
(a) generating RF signals from a transmitter;
(b) storing a portion of generated RF signals in an optical fiber RF storage subsystem;
(c) transmitting generated RF signals from an antenna subsystem;
(d) receiving a portion of reflected RF signals from an antenna subsystem;
(e) sending the reflected and stored RF signals to a coherent RF receiver; and
(f) processing the reflected RF signals by using the stored RF signals as a reference.

11. The method of claim 10 further comprise steps of:
(a) generating a RF signal train;
(b) storing a portion of the RF signal train before a transmission;
(c) transmitting the generated RF signal train;
(d) receiving a portion of reflected RF signal train;
(e) sending the stored and reflected RF signal trains for processing; and
(f) processing the reflected RF signal train by using the stored RF signal train as a reference.

12. The method of claim 10 further comprise steps of:
(a) generating a set of frequency stepped RF signals;
(b) storing a portion of frequency stepped RF signals before a transmission;
(c) transmitting the frequency stepped RF signals;
(d) receiving a portion of frequency stepped RF signals from reflection;
(e) sending the stored and reflected RF signals for processing;
(f) processing the frequency stepped RF signals from reflection by using the stored RF signals as a reference; and
(g) converting the processed RF signals to RF images.

13. The method of claim 10 further comprises steps of:
(a) sending the stored and reflected RF signals to an RF signal train generator;
(b) generating stored and reflected signal trains;
(c) sending two signal trains for processing; and
(d) processing the train of reflected RF signals by using the train of stored RF signals as a reference.

14. A passive RF system comprises:
an antenna subsystem;
an optical fiber RF storage subsystem;
a coherent RF receiver;
wherein the antenna subsystem comprises means for receiving RF signals; wherein the antenna subsystem receives a portion of RF signals; wherein the optical fiber RF storage subsystem comprises means for storing the portion of received RF signals; wherein the antenna subsystem receives sequential RF signals; wherein the coherent RF receiver comprises means for processing the sequential RF signals from the antenna subsystem by using the portion of stored RF signals from the optical fiber RF storage subsystem as a reference.

15. The passive RF system of claim 14 wherein said means for processing the sequential RF signals comprises means for determining time of arrivals for the sequential RF signals, for determining the total time delay of the stored RF signals in the optical fiber RF storage subsystem, and for selecting a total time delay of stored RF signals equal to the time of arrivals for the sequential RF signals.

16. The passive RF system of claim 14 wherein said means for processing the sequential RF signals further comprises an RF signal train generator for generating RF signal trains of stored and sequential RF signals; wherein the coherent RF receiver comprise means for processing the train of sequential RF signals by using the train of stored RF signals as a reference.

17. The passive RF system of claim 14 wherein said means for processing the sequential RF signals further comprises means for suppressing sideband modulations of the carrier frequencies of stored and sequential RF signals; wherein the coherent RF receiver comprise means for processing the sideband modulation suppressed and sequential RF signals by using the sideband modulation suppressed and stored signals as a reference.

18. The passive RF system of claim 14 wherein said antenna subsystem comprises an optical RF link system connecting with the coherent RF receiver; wherein the antenna subsystem is remotely separated from the coherent RF receiver.

19. The passive RF system of claim 14 which further comprises an optical RF link system; wherein the optical RF link system comprises means to link the antenna subsystem with the coherent RF receiver.

20. The passive RF system of claim 14 wherein said antenna subsystem is affixed to a movable means.

* * * * *